United States Patent
Koskinen et al.

(10) Patent No.: US 10,306,541 B2
(45) Date of Patent: May 28, 2019

(54) METHOD, APPARATUS AND COMPUTER PROGRAM FOR HANDLING OVERLAPPING INTERWORKING INFORMATION

(71) Applicant: Nokia Technologies Oy, Espoo (FI)

(72) Inventors: Jussi-Pekka Koskinen, Oulu (FI);
Ilkka Antero Keskitalo, Oulu (FI);
Sami Johannes Kekki, Helsinki (FI);
Jari Mutikainen, Lepsämä (FI)

(73) Assignee: Nokia Technologies Oy, Espoo (FI)

( * ) Notice: Subject to any disclaimer, the term of this patent is extended or adjusted under 35 U.S.C. 154(b) by 53 days.

(21) Appl. No.: 14/780,667

(22) PCT Filed: Apr. 5, 2013

(86) PCT No.: PCT/US2013/035497
§ 371 (c)(1),
(2) Date: Sep. 28, 2015

(87) PCT Pub. No.: WO2014/163648
PCT Pub. Date: Oct. 9, 2014

(65) Prior Publication Data
US 2016/0044586 A1    Feb. 11, 2016

(51) Int. Cl.
*H04W 48/16* (2009.01)
*H04W 72/04* (2009.01)
(Continued)

(52) U.S. Cl.
CPC ........... *H04W 48/16* (2013.01); *H04W 36/04* (2013.01); *H04W 72/0406* (2013.01);
(Continued)

(58) Field of Classification Search
CPC . H04W 36/0066; H04W 36/04; H04W 48/16; H04W 48/18; H04W 48/20; H04W 72/0493; H04W 88/06; H04W 76/046
See application file for complete search history.

(56) References Cited

U.S. PATENT DOCUMENTS

2014/0199995 A1* 7/2014 Singh ................ G06F 13/1663
                                                       455/426.1
2014/0199996 A1* 7/2014 Wang .................... H04W 36/14
                                                       455/426.1
(Continued)

FOREIGN PATENT DOCUMENTS

WO    2011050835    5/2011
WO    2011134496    11/2011
(Continued)

OTHER PUBLICATIONS

"New Study Item Proposal on WLAN/3GPP Radio Interworking", 3GPP TSG-RAN Meeting #58, RP-122038, Agenda Item: 13.2, Intel Corporation, Dec. 4-7, 2012, 6 pages.
(Continued)

*Primary Examiner* — Timothy J Weidner
*Assistant Examiner* — Debebe A Asefa
(74) *Attorney, Agent, or Firm* — Mintz Levin Cohn Ferris Glovsky and Popeo, P.C.

(57) ABSTRACT

Methods and apparatus, including computer program products, are provided for interworking. In one aspect there is provided a method. The method may include receiving interworking information, wherein the interworking information comprises at least one rule associated with network access; and receiving information from a network, wherein the information describes how to use the at least one rule associated with network access. Related apparatus, systems, methods, and articles are also described.

20 Claims, 7 Drawing Sheets

(51) Int. Cl.
  H04W 36/04   (2009.01)
  H04W 48/18   (2009.01)
  H04W 88/06   (2009.01)
  H04W 36/00   (2009.01)
  H04W 48/20   (2009.01)
(52) U.S. Cl.
  CPC ... *H04W 72/0446* (2013.01); *H04W 72/0493* (2013.01); *H04W 36/0066* (2013.01); *H04W 48/18* (2013.01); *H04W 48/20* (2013.01); *H04W 88/06* (2013.01)

(56) References Cited

U.S. PATENT DOCUMENTS

2015/0334644 A1* 11/2015 Kim .................. H04W 48/18 370/329
2015/0358900 A1* 12/2015 Duan .................. H04W 48/18 370/338

FOREIGN PATENT DOCUMENTS

WO   2013034948        3/2013
WO   2014/126440 A1    8/2014

OTHER PUBLICATIONS

"3rd Generation Partnership Project; Technical Specification Group Radio Access Network; Evolved Universal Terrestrial Radio Access (E-UTRA); LTE physical layer; General description (Release 12)", 3GPP TS 36.201, V12.2.0, Mar. 2015, pp. 1-14.

"3rd Generation Partnership Project; Technical Specification Group Radio Access Network; Evolved Universal Terrestrial Radio Access (E-UTRA); Physical channels and modulation (Release 12)", 3GPP TS 36.211, V12.7.0, Sep. 2015, pp. 1-136.

"3rd Generation Partnership Project; Technical Specification Group Radio Access Network; Evolved Universal Terrestrial Radio Access (E-UTRA); Multiplexing and channel coding (Release 12)", 3GPP TS 36.212, V12.6.0, Sep. 2015, pp. 1-95.

"3rd Generation Partnership Project; Technical Specification Group Radio Access Network; Evolved Universal Terrestrial Radio Access (E-UTRA); Physical layer procedures (Release 12)", 3GPP TS 36.213, V12.7.0, Sep. 2015, pp. 1-241.

"3rd Generation Partnership Project; Technical Specification Group Radio Access Network; Evolved Universal Terrestrial Radio Access (E-UTRA); Physical layer; Measurements (Release 12)", 3GPP TS 36.214, V12.2.0, Mar. 2015, pp. 1-17.

Office action received for corresponding European Patent Application No. 13720170.3, dated Jun. 11, 2018, 12 pages.

International Search Report and Written Opinion received for corresponding Patent Cooperation Treaty Application No. PCT/US2013/035497, dated Jan. 23, 2014, 14 pages.

"3rd Generation Partnership Project; Technical Specification Group Services and System Aspects; Architecture enhancements for non-3GPP access (Release 12)", 3GPP Stnadard; 3GPP TS 23.402, 3rd Generation Partnership Project (3GPP), Mobile Competence Centre; 650 Route Des Lucioles; F-06921 Sophia-Antipolis Cedex; France, vol. SA WG2, No. V12.0.1, Mar. 5, 2013 pp. 1-253.

"3rd Generation Partnership Project; Technical Specification Group Core Network and Terminals; Access to the 3GPP Evolved Packet Core (EPC) via non-3GPP access networks; Stage 3 (Release 12)", 3GPP Stnadard; 3GPP TS 24.302, 3rd Generation Partnership Project (3GPP), Mobile Competence Centre; 650 Route Des Lucioles; F-06921 Sophia-Antipolis Cedex; France, vol. CT EG1, No. V12.0.0, Mar. 11, 2013, pp. 1-61.

\* cited by examiner

METHOD, APPARATUS AND COMPUTER PROGRAM FOR HANDLING OVERLAPPING INTERWORKING INFORMATION

RELATED APPLICATION

This application was originally filed as PCT Application No. PCT/US2013/035497 filed Apr. 5, 2013.

FIELD

The subject matter described herein relates to wireless communications.

BACKGROUND

Interworking refers to the ability of different types of networks, such as HetNets, or nodes therein to work together. Wireless local area networks (WLANs) are becoming increasingly prevalent, so public land mobile network operators may also increasingly seek to exercise some control over wireless local area networks including small cells to improve user experience, provide more operator control, and enhance user experience as described in 3GPP RP-122038, TSG-RAN Meeting #58, Barcelona, Spain, 4-7 Dec. 2012 ("RP-122038"). For example, RP-122038 addresses mobility between public land mobile networks/cellular and WLANs.

SUMMARY

Methods and apparatus, including computer program products, are provided for interworking. In one aspect there is provided a method. The method may include receiving interworking information, wherein the interworking information comprises at least one rule associated with network access; and receiving information from a network, wherein the information describes how to use the at least one rule associated with network access.

In some variations, one or more of the following features can optionally be included in any feasible combination. The interworking information may be provided by at least one of the network or a user as a user setting. The information may be a command that overrides the interworking information. The command may be at least one of a handover command, an indication to prefer an access network, an access system change command, or a traffic routing command. The at least one rule may include at least one of a policy, a network discovery information, a system selection information, a system reselection information, a priority information, an access point, a cell selection information, and a cell reselection information. The information may indicate at least one portion of the at least one rule to apply. The information may indicate at least one portion of the at least one rule to ignore. The interworking information may include Access Network Discovery and Selection Function information. The information may include an indication to ignore at least a portion of the Access Network Discovery and Selection Function information. The information may be sent via a broadcast channel or via dedicated signaling. The information may be statically specified. The information may include an identity indicating whether to apply the at least one of the policy or the at least one rule. The information may be applicable during a defined time period. The information may be applicable within an indicated area.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings.

Like labels are used to refer to same or similar items in the drawings.

DETAILED DESCRIPTION

In some wireless local area network (WLAN) interworking solutions, a cellular network, such as LTE radio access network and/or the like, may provide assistance information to the user equipment, so the user equipment can search and select a WLAN access point for connection. The cellular network may thus advertise available WLAN access points known by the cellular network. This advertising of available access points may also facilitate access point changes, when needed (for example, to facilitate load balancing and/or the like). Access Network Discovery and Selection Function (ANDSF) may be used to provide the assistance information. When this is the case, the ANDSF may provide, for example, assistance information including identities, such as service set identifies (SSIDs), of the WLAN access points that the user equipment should consider when selecting a WLAN connection. This assistance information may also include WLAN selection priorities/preferences, selection policies (for example, when and/or under what circumstances to connect to the WLAN), and/or the like. However, ANDSF assistance information is relatively static and not considered to be responsive to real-time network conditions, so ANDSF assistance information may be complemented by additional radio access network (RAN) information, such as base station or cellular network provided RAN information.

In some example embodiments, the subject matter disclosed herein relates to handling ANDSF interworking information and RAN level interworking information. Moreover, the subject matter disclosed herein may, in some example embodiments, relate to overlapping, such as conflicting, ANDSF interworking information and RAN level interworking information and handling the conflict at the user equipment.

In some example embodiments, the user equipment may receive one or more rules, such as policy information, discovery information, system selection information, system re-selection information, priority information, access point or cell (re-)selection information, or the like, for handling for example ANDSF interworking information, WLAN Hotspot 2.0 information, RAN level interworking information, or the like. This rule information may be signaled (for example, via dedicated signaling or a broadcast) by the network to the user equipment, when the user equipment is coupled to the cellular network and/or a WLAN. In addition, the user equipment may be configured to determine when to ignore a portion of the ANDSF interworking assistance information given overlapping (for example, conflicting) information from the RAN. Further, the information received from the RAN can also be a specific command, for example a handover command, instruction to prefer a certain access network, a command to change the access system between two or more systems, a traffic routing command, or the like. The traffic routing command may be an instruction to route certain services or application data via one of the access networks. For example, best effort data may be routed via a wireless local area network, but real time services, such as voice or video calls, may be routed via a cellular network, while some applications (for example an instant messaging or social networking application, a voice over Internet application, and the like) may also use the wireless local area network when available.

In some example embodiments, the user equipment may receive a radio access network level indication (for example, a request and/or a command to select and couple to another network, such as a WLAN and/or the like. For example, the radio access network level indication may command the user equipment to use a certain wireless local area network. However, the user equipment may have ANDSF assistance information in conflict with the radio access network level indication to connect to another access network. The user equipment may be configured to ignore (for example, suspend, deleted, override, not utilize, and/or the like) a portion of the ANDSF information and proceed to connect to the wireless local area network. Referring to the previous example, the ANDSF policies may indicate access to the WLAN is not allowed under certain circumstances (for example, between the hours of 19:00 and 24:00), so the user equipment may ignore this ANDSF policy when the radio access network level indication represents a command or request by the radio access network to access the WLAN during the ANDSF prohibited times of 19:00 to 24:00.

In some example embodiments, the user equipment may receive an explicit indication that a certain portion of the ANDSF assistance information and/or a relevant management object (for example, management object of Hotspot 2.0) information should be ignored.

In some example embodiments, the user equipment may receive an indication from the radio access network, and this indication may request, command, and/or the like that ANDSF information should be ignored for a certain period of time. This time period may be signaled or statically specified.

In some example embodiments, the user equipment may receive radio access network level information but the validity of this information may be limited to a specific location (for example, an area in the resolution of a cell, a tracking area, and/or other defined area). As such, the user equipment may apply the ANDSF assistance information including policies when outside of the specific location.

Before providing additional examples, the following provides an example of a system framework in which some of the example embodiments described herein may be implemented.

Figure 1:
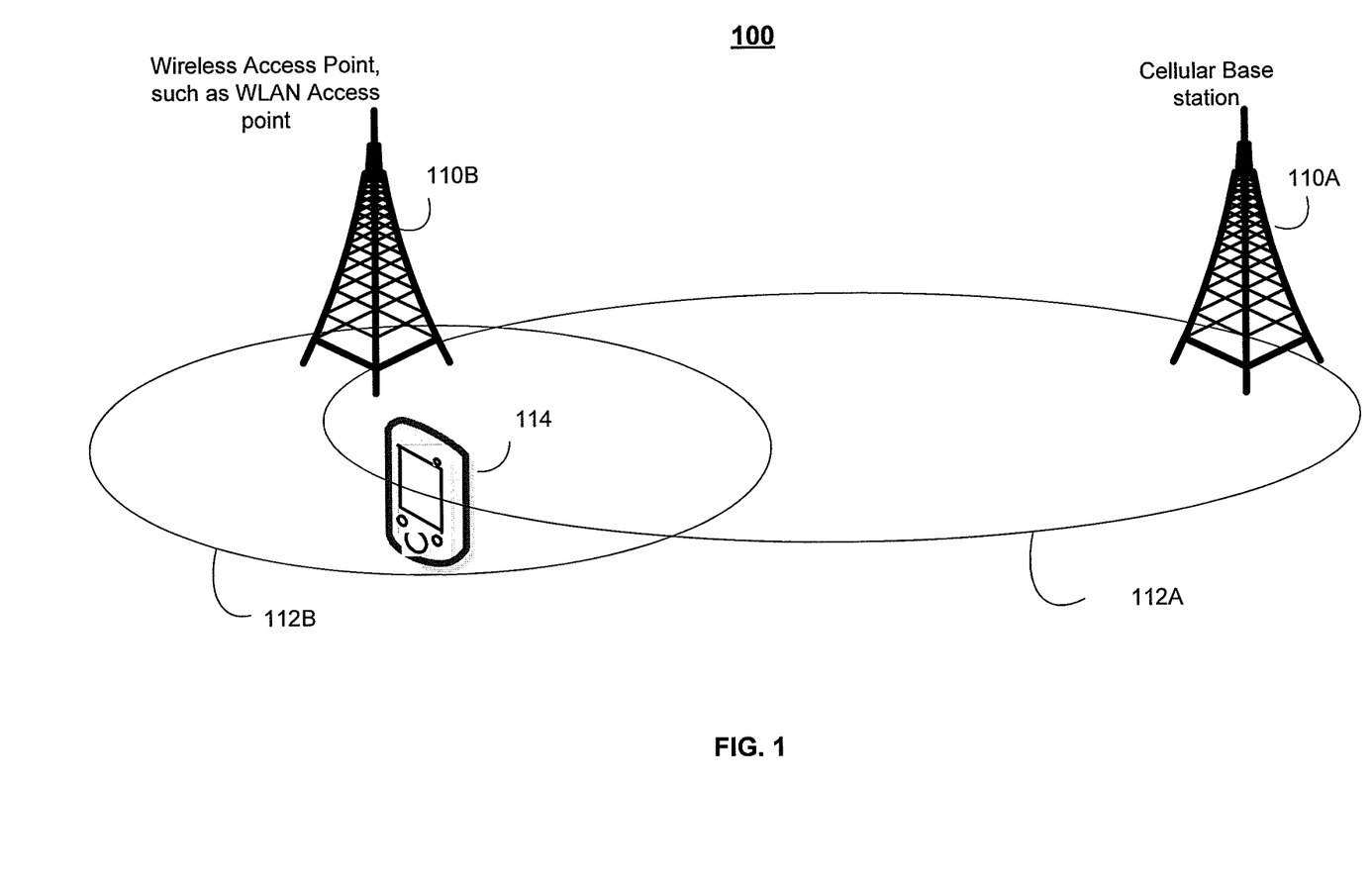
FIG. 1 depicts an example of a system configured to handle interworking, in accordance with some exemplary embodiments.

FIG. 1 depicts a system 100 including a base station 110A and a wireless access point 110B, in accordance with some example embodiments. In the example of FIG. 1, base station 110A is implemented as an eNB base station serving a macrocell 112A (also referred to as a cell and/or a coverage area). Wireless access point 110B may be configured to serve a wireless local area network, such as small cell 112B. For example, wireless access point 110B may be implemented as a WiFi access point, although other radio technologies may be used as well.

Base station 110A may, in some exemplary embodiments, be implemented as an evolved Node B (eNB) type base station, as noted above. When this is the case, base station 110A may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards).

Wireless access point 110B may, in some exemplary embodiments, be implemented as a WiFi access point, a picocell base station, a femtocell base station, a home base station, and/or a home E-UTRAN node B base station (HeNB), although any other type of access point may be used as well.

Although FIG. 1 depicts an example of a configuration for the base station 110A and wireless access point 110B, base station 110A and wireless access point 110B may be configured in other ways. For example, base station 110A and wireless access point 110B may have wired and/or wireless backhaul links to other network nodes, such as a mobility management entity, other base stations and wireless access points, a radio network controller, a core network, a serving gateway, and/or the like.

In some exemplary embodiments, system 100 may include wireless access links. The access links may include downlinks for transmitting to user equipment and an uplink for transmitting from user equipment to a base station or wireless access point. The downlink and uplink may each comprise a modulated radio frequency carrying information, such as user data, radio resource control (RRC) messages, and/or the like.

In some exemplary embodiments, user equipment 114 may be implemented as a mobile device and/or a stationary device. The user equipment 114 are often referred to as, for example, mobile stations, mobile units, subscriber stations, wireless terminals, tablets, smart phones, or the like. A user equipment may be implemented as, for example, a wireless handheld device, a wireless plug-in accessory, or the like. In some cases, user equipment may include a processor, a computer-readable storage medium (e.g., memory, storage, and/or the like), a radio access mechanism, and/or a user interface.

Although FIG. 1 depicts single base station 110B, a single wireless access point 110B, two cells, such as macrocell 112A and small cell 112B, and a single user equipment 114, the system 100 may include other quantities and types of devices as well.

Figure 2:
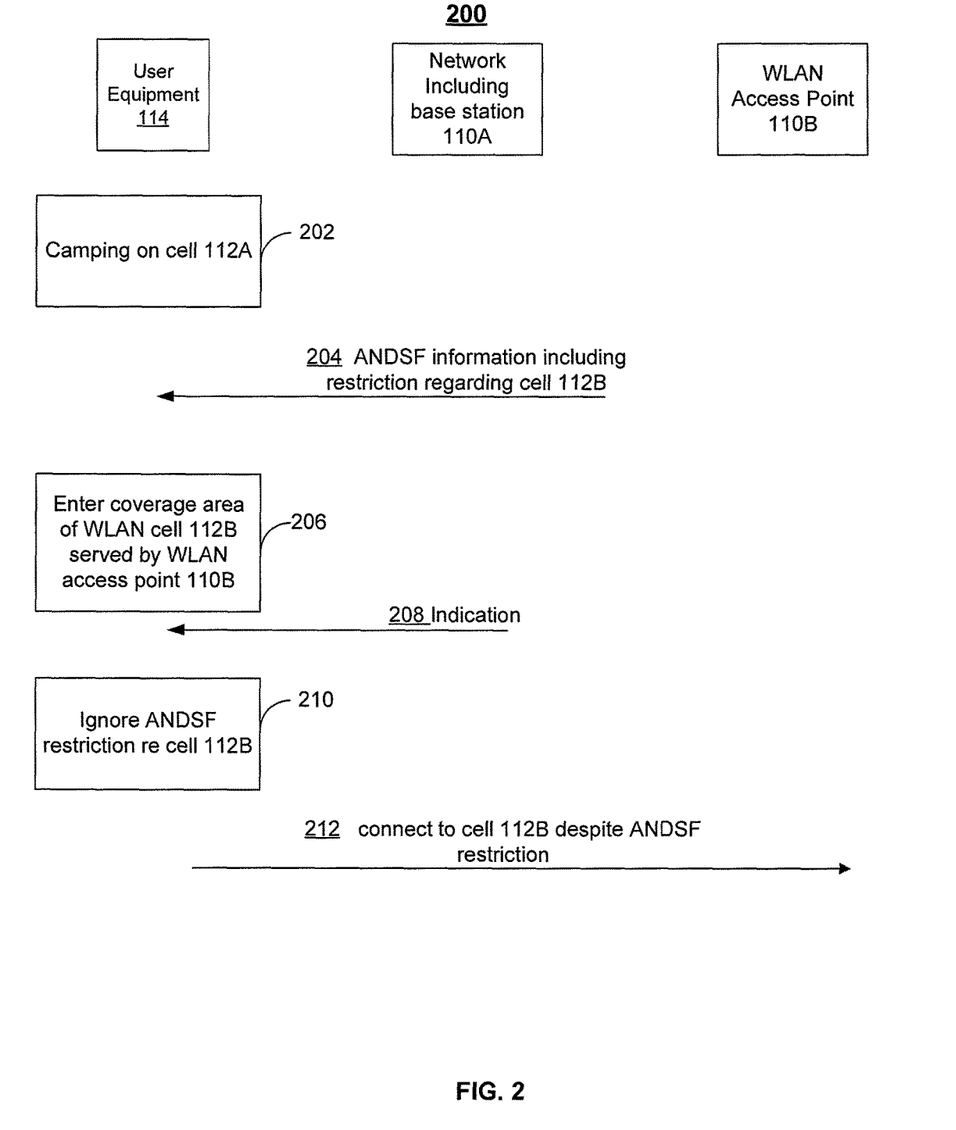
FIGS. 2-5 depict example processes for handling overlapping interworking information, in accordance with some exemplary embodiments.

FIG. 2 depicts an example of a process 200 for handling internetworking, in accordance with some example embodiments. In the example process 200, the user equipment 114 may perform a command provided by the network and ignore a portion of the assistance information related to interworking, when the assistance information is in conflict with the cellular or radio access network command.

At 202, the user equipment 114 may be camped on a cellular cell, such as a cell 112A served by a cellular base station 110A.

At 204, user equipment 114 may receive assistance information which may be provided as ANDSF information, in accordance with some example embodiments. For example, the ANDSF information may include information indicating that user equipment 114 should not (or shall not) perform an interworking operation, such as connect to a wireless local area network, such as cell 112B having a certain SSID "X" under one or more certain conditions/circumstances. To illustrate, this circumstance or condition may specify that a connection to cell 112B and corresponding wireless access point 110B may not be allowed as a policy rule between the hours of 15:00 to 17:00.

At 206, user equipment 114 may enter the coverage area of a certain wireless local area network, such as cell 112B and wireless access point 110B. For example, user equipment 114 may enter cell 112B having SSID "X." And, this entry may occur at 15:30 hours, which is within the do not connect time provided by the ANDSF information at 204.

At 208, the radio access network, such as cellular base station 110A, may indicate to user equipment 114 (via a broadcast and/or dedicated signaling) to connect to the wireless local area network, such as cell 112B and wireless access point 110B, having SSID X, in accordance with some example embodiments. In this example, the user equipment 114 is handling a conflict between the assistance information provided at 204 via ANDSF and the radio access network/cellular network provided command of 208.

At 210, user equipment 114 may ignore a portion of the ANDSF information received at 204 and proceed, at 212, with the connection commanded at 208 by the radio access network/base station 110A. For example, user equipment 114 may be configured to ignore the date and time restriction received at 204 as part of the ANDSF assistance information (which prevents connections between 15:00 and 17:00 hours to the WLAN at SSID "X") and to connect to WLAN cell 112B, where the WLAN having the SSID X is located. When user equipment 114 exits coverage area 112B of the WLAN at SSID X and thus disconnects from wireless access point 110B, user equipment 114 may resume the ignored policy provided in the ANDSF information at 204 (at least until a command from network 110A contravenes an ANDSF policy provided at 204).

Figure 3:
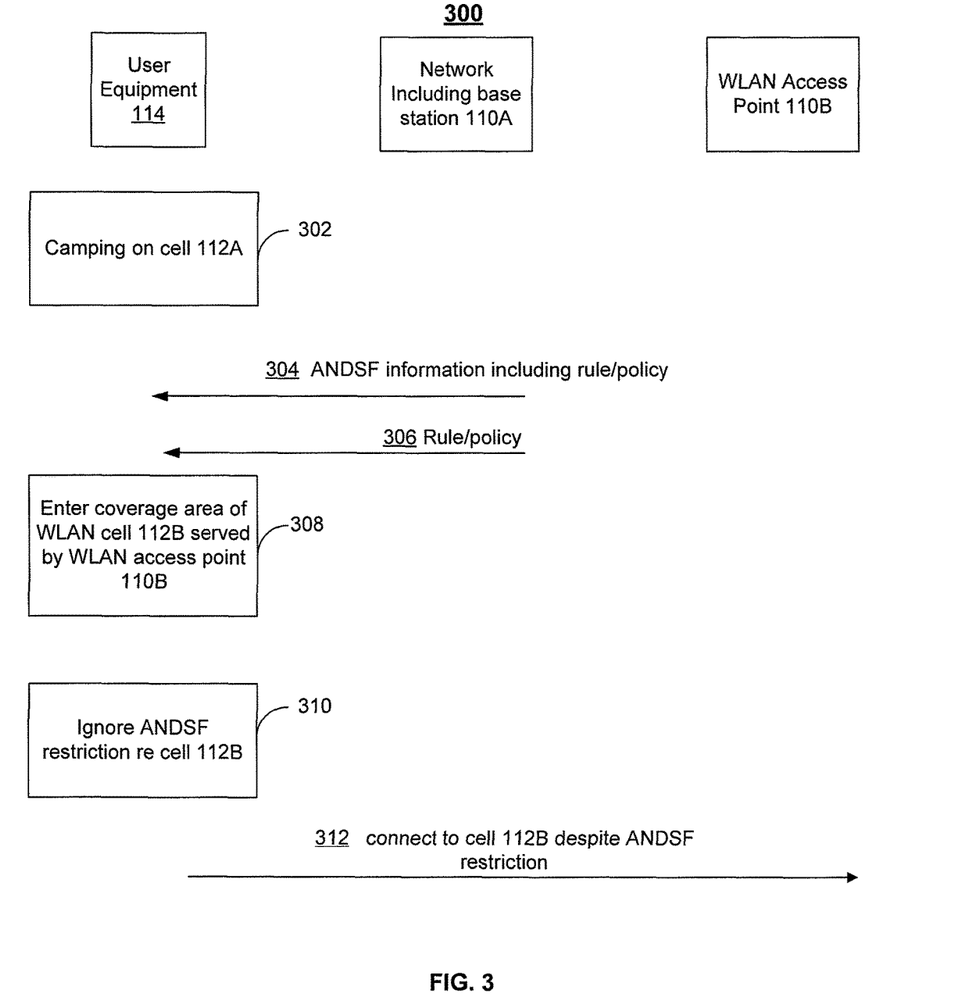

FIG. 3 depicts an example of a process 300 for handling internetworking in accordance with some example embodiments.

At 302, the user equipment 114 may be camped on a cellular cell, such as a cell 112A served by a cellular base station 110A.

At 304, user equipment 114 may receive assistance information, such as ANDSF information, in accordance with some example embodiments. For example, the ANDSF information may include information indicating that user equipment 114 should not (or shall not) connect to a wireless local area network, such as cell 112B, under one or more certain circumstances. In this example embodiment, a circumstance may be to not connect to a certain wireless local area network, such as cell 112B having a certain SSID "X," if a backhaul load (and/or some other metric or condition) in the WLAN cell 112B is more than a certain threshold (for example, 70%), which would indicate possible congestion at the cell 112B.

At 306, user equipment 114 may receive (via a broadcast or explicit signaling) from the radio access network including base station 110A information representative of a rule. For example, base station 110A may send a rule (for example, a policy) to user equipment 114 that it should not (or shall not) connect to a wireless local area network, such as cell 112B having SSID X, if the backhaul load in WLAN cell 112B is more than 80%, which is different than the 70% threshold provided at 304 via ANDSF. Again, user equipment 114 may be configured to handle this interworking conflict. In some example embodiments, the rule at 306 may be restricted in time and/or location as well. For example, the 80% limitation may be valid only while user equipment 114 is coupled to base station 110A and/or the 80% limitation may be valid for a certain time frame.

At 308, user equipment 114 may enter the coverage area for cell 112B having SSID X, and evaluate policies and/or rules, in accordance with some example embodiments. For example, user equipment 114 may determine that the backhaul load of cell 112B having SSID X is 75%. Here, the user equipment 114 may be configured to ignore, based on the rule received at 306, a portion of the policy/assistance information provided at 304 by the ANDSF (for example, do not connect to the WLAN if greater than 70%) and, instead, adhere to the rule provided at 306 which sets a higher threshold of 80%.

At 310-312, user equipment 114 may connect to a wireless local area network, such as cell 112B having SSID X (which in this example has a 75% backhaul load), and thus ignore a portion of the policy/assistance information provided by the ANDSF (for example, restricting connect to the WLAN if the backhaul load is greater than 70%), in accordance with some example embodiments. However, when user equipment 114 exits cell 112A and enters another cell, user equipment 114 may disable the rule (or policy) received at 306 and thus revert to the policy/rule provided at 304 as part of the ANDSF.

Figure 4:
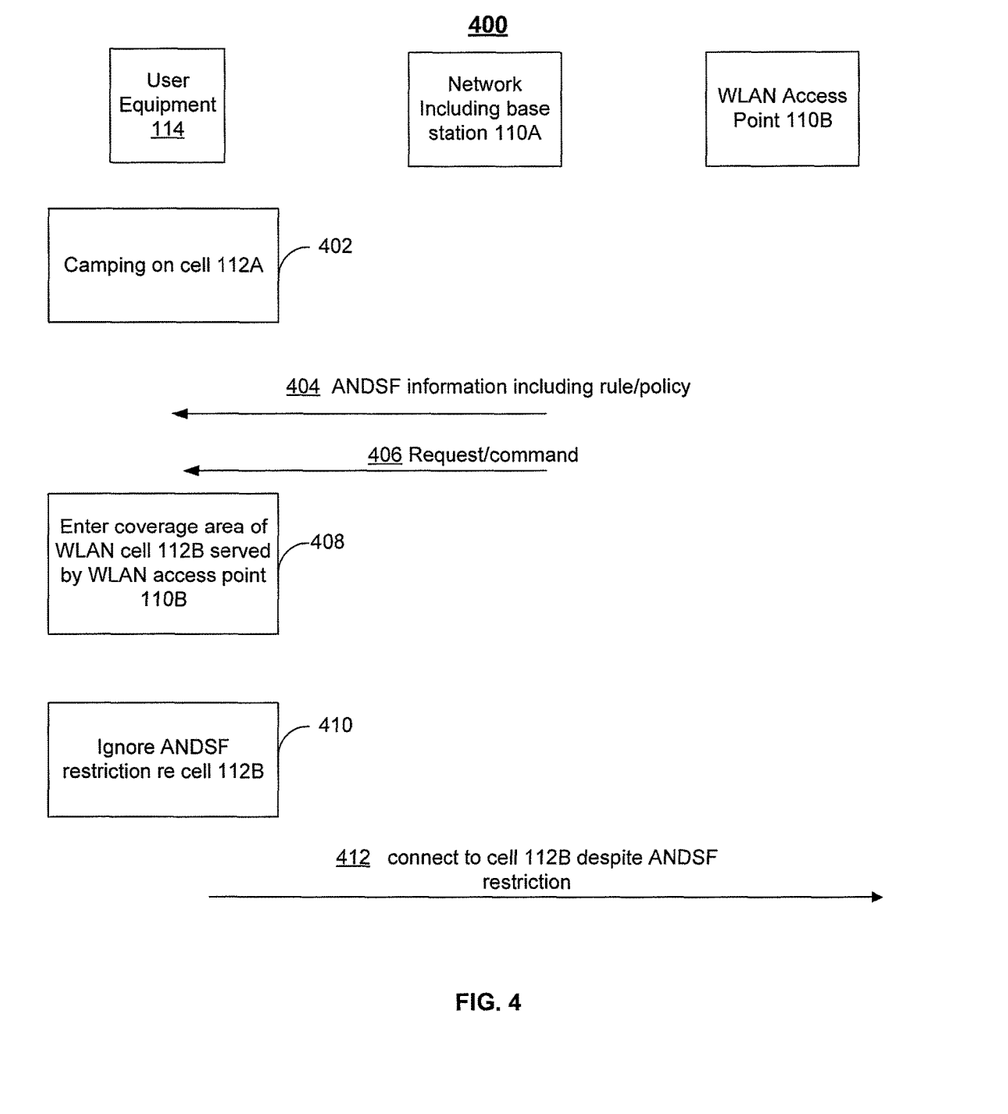

FIG. 4 depicts another example of a process 400 for handling internetworking, in accordance with some example embodiments.

At 402, user equipment 114 may be camped on a cellular cell, such as cell 112A served by a cellular base station 110A.

At 404, user equipment 114 may receive assistance information, such as ANDSF information, in accordance with some example embodiments. This ANDSF information may indicate that user equipment 114 should not (or shall not) connect to a wireless local area network, such as cell 112B having SSID X, if the backhaul load in WLAN cell 112B is more than 70%.

At 406, base station 110A including cell 112A signals to user equipment 114 (via dedicated or broadcast signaling) a certain request or a certain command to connect or access another network. However, the ANDSF policy received at 404 has configured the command received at 406 to have a certain meaning. This certain meaning requires the user equipment 114 while in cell 112A to not connect to cell 112B having SSID X, when the backhaul load in cell 112B identified as SSID X is more than 80%.

At 408, user equipment 114 enters cell 112B having SSID X and determines the backhaul load (of, for example, some other metric) at cell 112B as a 75% backhaul load.

At 410-412, user equipment 114 may connect to wireless local area network, such as cell 112B having SSID X, where there is a 75% backhaul load, and thus ignore a portion of the policy/assistance information provided by the ANDSF (for example, do not connect to the WLAN if greater than 70%), in accordance with some example embodiments. Again, when user equipment 114 exits cell 112A and enters another cellular cell, the user equipment 114 may enable policy/rule provided at 404 as part of the ANDSF.

Figure 5:
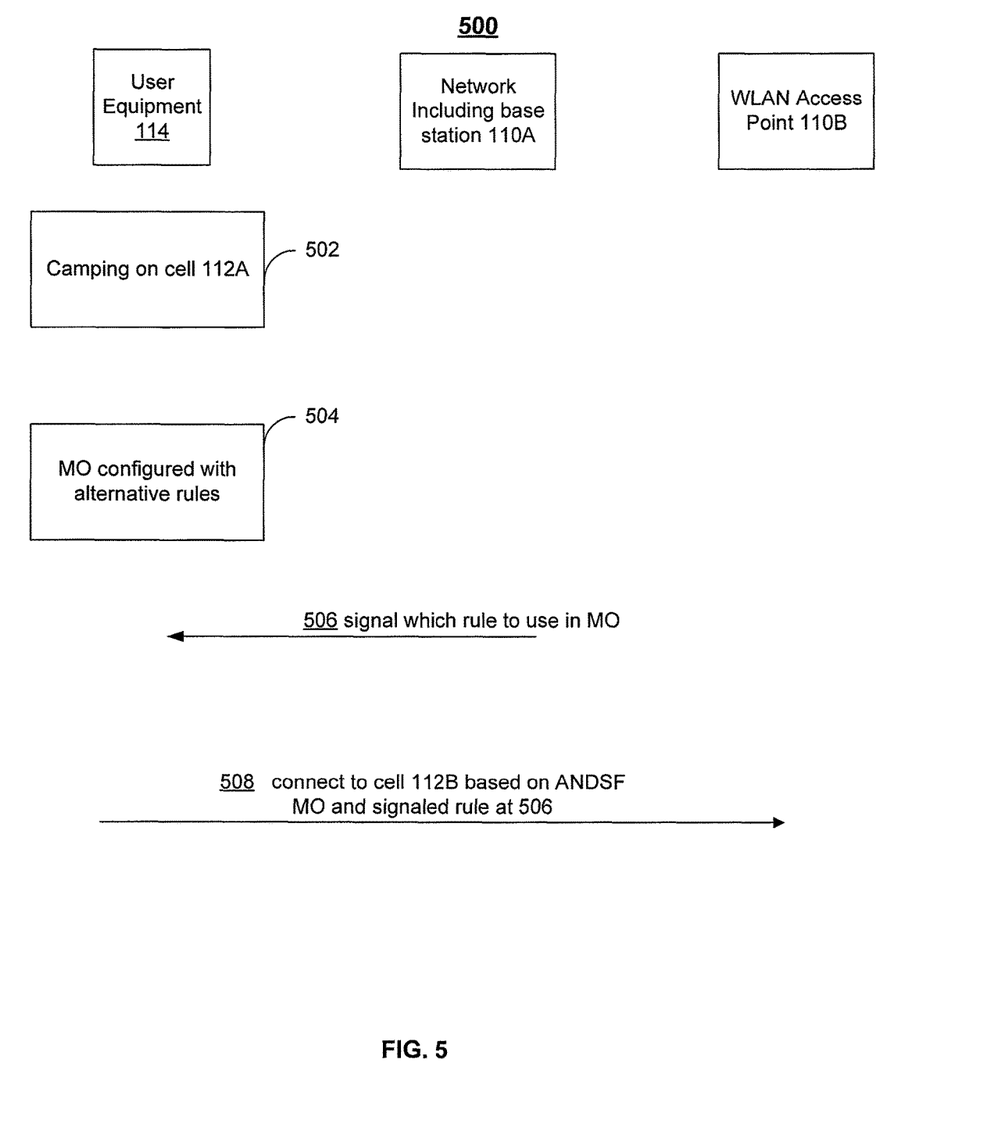

FIG. 5 depicts another example of a process 500 for handling internetworking, in accordance with some example embodiments.

At 502, the user equipment 114 may be camped on a cellular cell, such as a cell 112A served by a cellular base station 110A.

At 504, the user equipment 114 may include a management object, such as an ANDSF Management Object, for the public land mobile network. This management object may include one or more policies, some of which may be alternative rules and/or flow distribution containers, and these policies, rules, and/or flows may be known to user equipment 114. For example, the management object may include alternative rules for a given policy, and these rules may define for example different threshold values for the validity of the given policy. To illustrate, the management object may include a first rule, a second rule, a third rule, and so forth. The first rule may define selecting and accessing a certain WLAN having an SSID "X" if the backhaul load is less than 60%, a second rule may define selecting and accessing a certain WLAN having WLAN SSID "X" if the backhaul load is less than 70%, a third rule may define selecting and accessing a certain WLAN having WLAN SSID "X" if the backhaul load is less than 80%, and so forth.

At 506, the radio access network including base station 110A may signal to the user equipment 114 (via broadcast channel and/or by using dedicated signaling), an indication. This indication may represent an identifier of at least one of the alternative rules to be followed by the user equipment 114. For example, if the indication represents 1, user equipment 114 may implement the first rule at the management object, such as use a certain WLAN having an SSID "X" if the load is less than 60%, but ignore the other corresponding portions (for example, rules) of the ANDSF management object. As such, the indication signaled by the radio access network/base station 110A may prompt the user equipment to thus ignore a portion of the ANDSF Management Object.

At 508, user equipment 114 may proceed based on the signaled indication at 506 by coupling to a cell, such as cell 112B having an SSID "X," based on the indicated alternative rules, which in this example represents connect if the load is less than 60%. Once the condition goes back to normal, the base station 110A stops broadcasting the alternative rule identifier, and/or the user equipment exits cell 112A, user equipment 114 may revert to following default policies/rules/flow distribution containers of the ANDSF management object. The cell may change the broadcasted policy/rule identifier to default, or the cell signals to the user equipment the rule to be followed via dedicated signaling. Whenever the user equipment is under the cell where there is no alternative rule identifier available in the radio, the user equipment may follow the default policies and rules in the management object.

The procedures for applying the disclosed features above may be specified in standards, signaled via commands triggering and controlling the operation of the user equipment, pre-provisioned as rules for the user equipment, and/or specified statically that RAN level information overrides ANDSF information. The RAN level information can be specified to override any other interworking related rules and even user preferences, not only ANDSF information.

Although FIGS. 2-5 provide specific values for SSIDs, rules, policies, circumstances, thresholds, conditions, and/or the like, these are examples as other values may be used as well.

Figure 6:
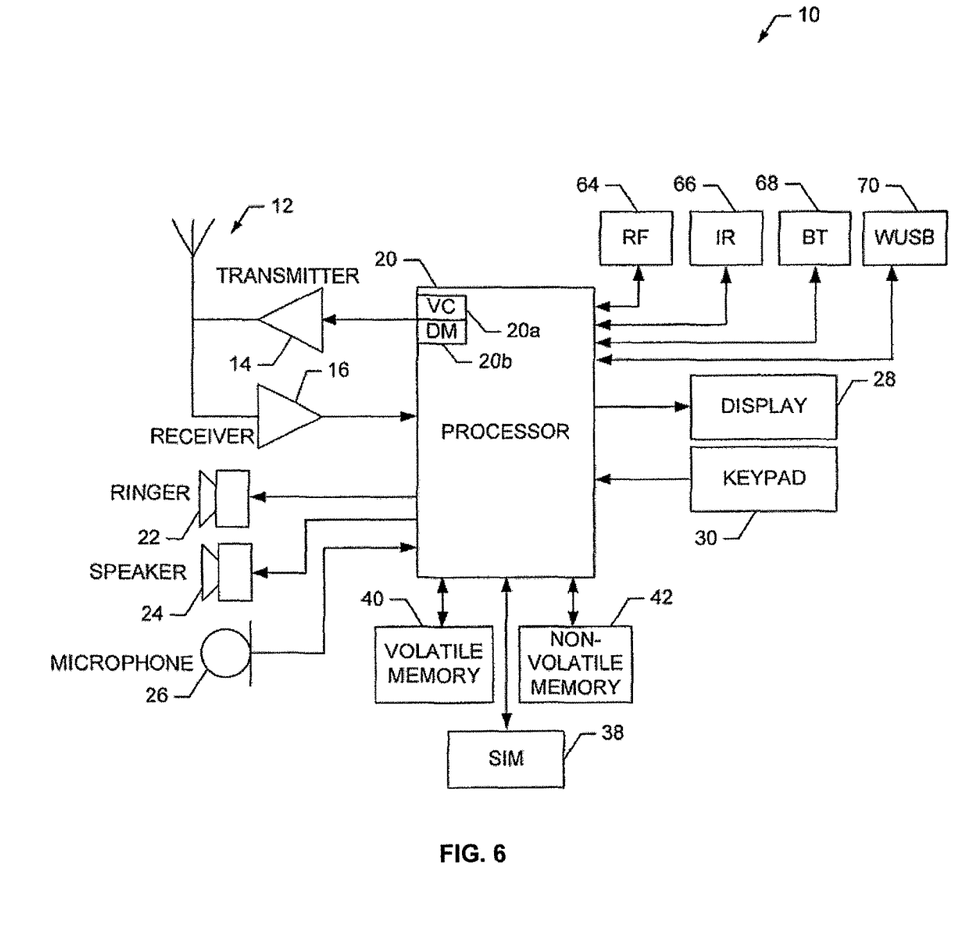
FIG. 6 depicts an example of a user equipment, in accordance with some exemplary embodiments.

FIG. 6 illustrates a block diagram of an apparatus 10, which can be configured as user equipment in accordance with some example embodiments.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example, a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 6 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example, Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as for example, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example, Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as for example, LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example, a web browser. The connectivity program may allow the apparatus 10 to transmit and receive web content, such as for example, location-based content, according to a protocol, such as for example, wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example, a keypad 30 (which can be a virtual keyboard presented on display 28 or an externally coupled keyboard) and/or other input devices.

As shown in FIG. 6, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as for example, an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example, within 10 meters, for example. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as for example, IEEE 802.11 techniques, IEEE 802.15 techniques, IEEE 802.16 techniques, and/or the like.

The apparatus 10 may comprise memory, such as for example, a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as for example, an international mobile equipment identification (IMEI) code, capable of uniquely identifying apparatus 10. The functions may include one or more of the operations disclosed herein with respect to the user equipment, such as for example, the functions disclosed at process 200 (for example, activate the cellular modem and/or the like). The memories may comprise an identifier, such as for example, an international mobile equipment identification (IMEI) code, capable of uniquely identifying apparatus 10. In the example embodiment, the processor 20 may be configured using computer code stored at memory 40 and/or 42 to enable handling overlapping assistance information and radio access network information, inhibiting portions of the assistance information to comply with an indication, such as a command, a request, a rule, and/or the like provided as radio access network information to the apparatus, and/or any other function associated with the user equipment or apparatus disclosed herein.

Figure 7:
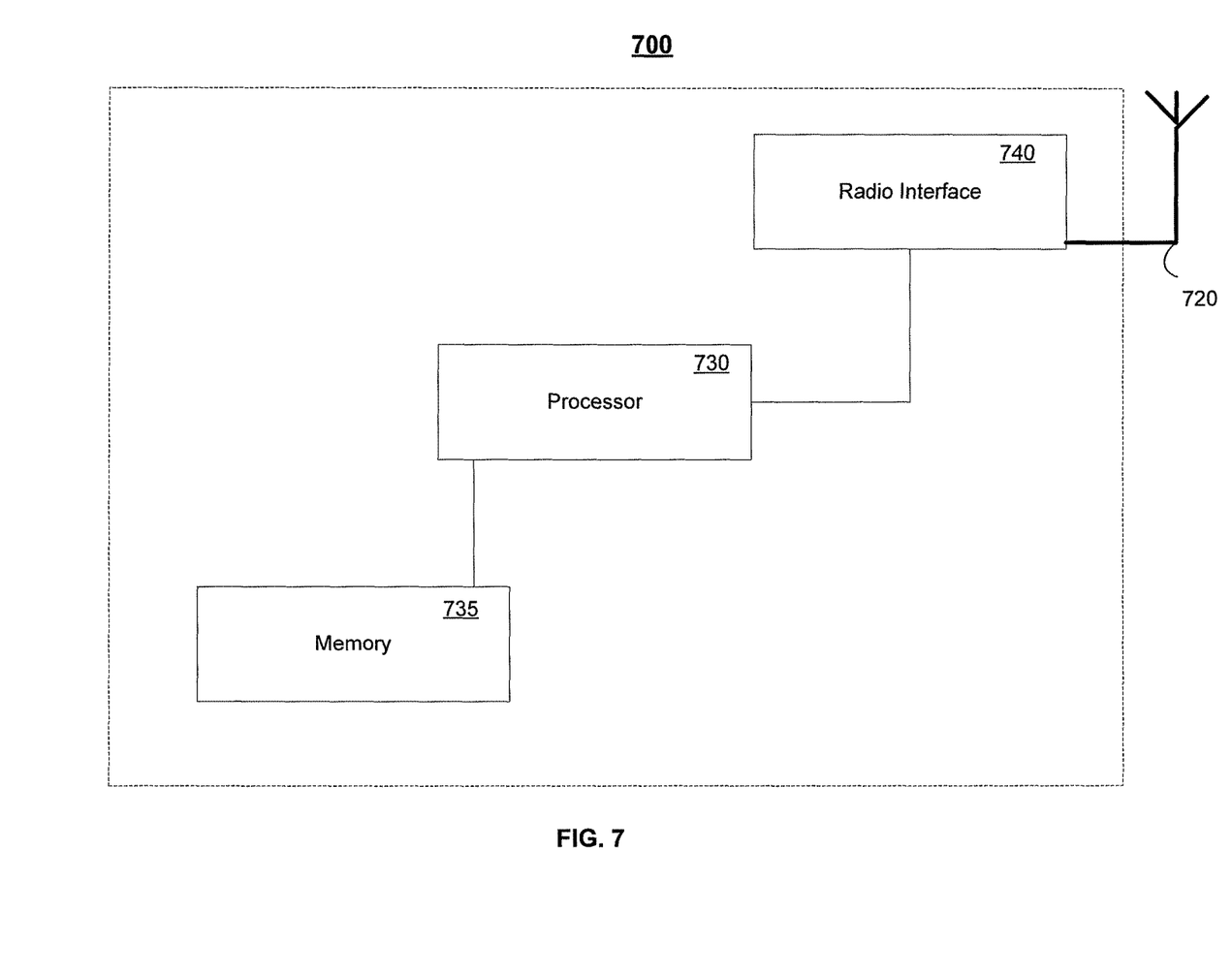
FIG. 7 depicts an example of a base station, in accordance with some exemplary embodiments.

FIG. 7 depicts an example implementation of a network node, such as base station 110A and/or wireless access point 110B. The network node may include one or more antennas 720 configured to transmit via a downlink and configured to receive uplinks via the antenna(s) 720. The network node may further include a plurality of radio interfaces 740 coupled to the antenna 720. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as for example 802.11 WiFi and/or the like, Bluetooth, Bluetooth low energy (BT-LE), near field communications (NFC), and any other radio technologies. The radio interface 740 may further include other components, such as filters, converters (for example, digital-to-analog converters and/or the like), mappers, a Fast Fourier Transform (FFT) module, and/or the like, to generate symbols for a transmission via one or more downlinks and to receive symbols (for example, via an uplink). The network node may further include one or more processors, such as processor 730, for controlling the network node and for accessing and executing program code stored in memory 735. In some example embodiments, memory 735 includes code, which when executed by at least one processor causes one or more of the operations described herein with respect to a base station and/or a wireless access point. For example, the network node may signal information, such as indications, commands, requests, rules, and other information related to interworking, to configure an operation at the user equipment, despite assistance information, which may indicate a preference for not implementing the operation.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as for example, a computer or data processor, with examples depicted at FIGS. 6 and 7. A computer-readable medium may comprise a non-transitory computer-readable storage medium that may be any media that can contain or store the instructions for use by or in connection with an instruction execution system, apparatus, or device, such as for example, a computer. And, some of the embodiments disclosed herein include computer programs configured to cause methods as disclosed herein (see, for example, processes 200, 300, 400, 500 and/or the like).

Without in any way limiting the scope, interpretation, or application of the claims appearing below, a technical effect of one or more of the example embodiments disclosed herein enhanced interworking by ignoring selected portions of assistance information, when overlapping with selected radio access network information, such as commands and/or the like.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:

1. A method, comprising:
   receiving, at a user equipment, interworking information, wherein the interworking information comprises at least one rule for handling Access Network Discovery and Selection Function information (ANDSF);
   receiving, at the user equipment, radio access network information from a base station, wherein the radio access network information describes how to use the at least one rule for handling ANDSF information; and
   ignoring, by the user equipment, at least one portion of the at least one rule when the interworking information overlaps with the radio access network information, wherein the ignoring the at least one portion of the at least one rule triggers the user equipment to route traffic to an access network.

2. The method of claim 1, wherein the radio access network information is a command that overrides the interworking information.

3. The method of claim 2, wherein the command is at least one of a handover command, an indication to prefer an access network, an access system change command, or a traffic routing command.

4. The method of claim 1, wherein the at least one rule includes at least one of a policy, a network discovery information, a system selection information, a system reselection information, a priority information, an access point, a cell selection information, and a cell reselection information.

5. The method of claim 1, wherein the radio access network information indicates at least one portion of the at least one rule to apply.

6. The method of claim 1, wherein the radio access network information indicates at least one portion of the at least one rule to ignore.

7. The method of claim 1, wherein ignoring at least one portion of the at least one rule comprises suspending, deleting, overriding, or not utilizing at least one portion of the at least one rule.

8. An apparatus comprising:
   at least one processor; and
   at least one memory including computer program code, the at least one memory and the computer program code configured to, with the at least one processor, cause the apparatus to at least:
   receive interworking information, wherein the interworking information comprises at least one rule for handling Access Network Discovery and Selection Function information (ANDSF);
   receive radio access network information from a base station, wherein the radio access network information describes how to use the at least one rule for handling ANDSF information; and
   ignore at least one portion of the at least one rule when the interworking information overlaps with the radio access network information, wherein the computer program code is further configured to ignore the at least one portion of the at least one rule by triggering the apparatus to route traffic to an access network.

9. The apparatus of claim 8, wherein the interworking information is provided by at least one of the network or a user as a user setting.

10. The apparatus of claim 8, wherein the radio access network information is a command that overrides the interworking information.

11. The apparatus of claim 10, wherein the command is at least one of a handover command, an indication to prefer an access network, an access system change command, or a traffic routing command.

12. The apparatus of claim 8, wherein the at least one rule includes at least one of a policy, a network discovery information, a system selection information, a system reselection information, a priority information, an access point, a cell selection information, and a cell reselection information.

13. The apparatus of claim 8, wherein the radio access network information indicates at least one portion of the at least one rule to apply.

14. The apparatus of claim 8, wherein the radio access network information indicates at least one portion of the at least one rule to ignore.

15. The apparatus of claim 8, wherein the interworking information comprises Access Network Discovery and Selection Function information.

16. The apparatus of claim 15, wherein the radio access network information includes an indication to ignore at least a portion of the Access Network Discovery and Selection Function information.

17. The apparatus of claim 8, wherein the radio access network information comprises an identity indicating whether to apply the at least one of the policy or the at least one rule.

18. The apparatus of claim 8, wherein the radio access network information is applicable during a defined time period.

19. The apparatus of claim 8, wherein the radio access network information is applicable within an indicated area.

20. The apparatus of claim 8, wherein ignoring at least one portion of the at least one rule comprises suspending, deleting, overriding, or not utilizing at least one portion of the at least one rule.

* * * * *